(12) United States Patent
Campbell et al.

(10) Patent No.: US 11,939,686 B2
(45) Date of Patent: Mar. 26, 2024

(54) SEPARATION AND CONVERSION OF CARBON DIOXIDE TO SYNGAS USING A POROUS CERAMIC DUAL MEMBRANE IN A THERMO-ELECTROCHEMICAL REACTOR

(71) Applicant: Lawrence Livermore National Security, LLC, Livermore, CA (US)

(72) Inventors: Patrick Campbell, Oakland, CA (US); Maira Ceron Hernandez, Livermore, CA (US); Jeremy Taylor Feaster, Fremont, CA (US); Sneha Anil Akhade, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 517 days.

(21) Appl. No.: 17/115,534

(22) Filed: Dec. 8, 2020

(65) Prior Publication Data

US 2022/0178036 A1    Jun. 9, 2022

(51) Int. Cl.
*C25B 13/00* (2006.01)
*B01D 53/22* (2006.01)
(Continued)

(52) U.S. Cl.
CPC ............ *C25B 13/07* (2021.01); *B01D 53/228* (2013.01); *B01D 53/229* (2013.01); *B01D 53/62* (2013.01);
(Continued)

(58) Field of Classification Search
CPC ......... C25B 13/07; C25B 11/031; C25B 1/23; C25B 15/027; C25B 5/00; C25B 13/02;
(Continued)

(56) References Cited

U.S. PATENT DOCUMENTS 10,464,015 B2    11/2019    Worsley et al.
10,622,656 B2    4/2020    Al Hunaidy et al.
(Continued)

FOREIGN PATENT DOCUMENTS

WO    2017200764 A1    11/2017
WO    2018148524 A1    8/2018
(Continued)

OTHER PUBLICATIONS

International Search Report and Written Opinion from PCT Application No. PCT/US2021/056893, dated Mar. 4, 2022.
(Continued)

*Primary Examiner* — Zulmariam Mendez
(74) *Attorney, Agent, or Firm* — Zilka-Kotab, P.C.

(57) ABSTRACT

A thermo-electrochemical reactive capture apparatus includes an anode and a cathode, wherein the anode includes a first catalyst, wherein the cathode includes a second catalyst, a porous ceramic support positioned between the anode and the cathode, an electrolyte mixture in pores of the ceramic support, and a steam flow system on an outer side of the cathode. The outer side of the cathode is opposite an inner side of the cathode and the inner side of the cathode is adjacent to the ceramic support. In addition, the electrolyte mixture is configured to be molten at a temperature below about 600° C.

23 Claims, 6 Drawing Sheets

(51) Int. Cl.
| | |
|---|---|
| B01D 53/62 | (2006.01) |
| B01D 67/00 | (2006.01) |
| B01D 69/02 | (2006.01) |
| B33Y 70/10 | (2020.01) |
| B33Y 80/00 | (2015.01) |
| C25B 1/23 | (2021.01) |
| C25B 5/00 | (2006.01) |
| C25B 11/031 | (2021.01) |
| C25B 13/02 | (2006.01) |
| C25B 13/07 | (2021.01) |
| C25B 15/00 | (2006.01) |
| C25B 15/027 | (2021.01) |

(52) U.S. Cl.
CPC ......... *B01D 67/0093* (2013.01); *B01D 69/02* (2013.01); *B33Y 70/10* (2020.01); *B33Y 80/00* (2014.12); *C25B 1/23* (2021.01); *C25B 5/00* (2013.01); *C25B 11/031* (2021.01); *C25B 13/02* (2013.01); *C25B 15/027* (2021.01); *B01D 2257/102* (2013.01); *B01D 2257/504* (2013.01); *B01D 2258/0283* (2013.01); *B01D 2323/36* (2013.01); *B01D 2325/02* (2013.01)

(58) Field of Classification Search
CPC ...... B33Y 80/00; B33Y 70/10; B01D 53/228; B01D 53/229; B01D 53/62; B01D 67/0093; B01D 69/02; B01D 2257/102; B01D 2257/504; B01D 2258/0283; B01D 2323/36; B01D 2325/02
See application file for complete search history.

(56) References Cited

U.S. PATENT DOCUMENTS

| | | | |
|---|---|---|---|
| 2009/0004072 | A1 | 1/2009 | Jamamoto et al. |
| 2013/0177489 | A1 | 7/2013 | Dube |
| 2016/0175768 | A1 | 6/2016 | Hansen et al. |
| 2017/0333834 | A1 | 11/2017 | Worsley et al. |
| 2019/0134609 | A1* | 5/2019 | Yamauchi ............ B01J 35/0033 |
| 2019/0379063 | A1 | 12/2019 | Campbell et al. |
| 2019/0389778 | A1 | 12/2019 | Campbell et al. |
| 2020/0102663 | A1* | 4/2020 | Xu ......................... C25B 13/02 |
| 2020/0114333 | A1 | 4/2020 | Campbell et al. |
| 2020/0283920 | A1 | 9/2020 | Bairamijamal |
| 2020/0358112 | A1* | 11/2020 | Chatroux ............... C25B 15/08 |

FOREIGN PATENT DOCUMENTS

| | | |
|---|---|---|
| WO | 2018237336 A1 | 12/2018 |
| WO | 2019236907 A1 | 12/2019 |

OTHER PUBLICATIONS

Ceron et al., "Surpassing the conventional limitations of $CO_2$ separation membranes with hydroxide/ceramic dual-phase membranes," Journal of Membrane Science, vol. 567, 2018, pp. 191-198.

An et al., "Environmental Performance Analysis of Cement Production with $CO_2$ Capture and Storage Technology in a Life-Cycle Perspective," Sustainability, vol. 11, 2019, 13 pages.

Lao et al., "The steps of activating a prospective $CO_2$ hydrogenation catalyst with combined $CO_2$ capture and reduction," Green Chemistry, vol. 18, 2016, pp. 4871-4874.

Sen et al., "Hydroxide Based Integrated $CO_2$ Capture from Air and Conversion to Methanol," Journal of the American Chemical Society, vol. 142, 2020, pp. 4544-4549.

Voldsund et al., "Comparison of Technologies for $CO_2$ Capture from Cement Production—Part 1: Technical Evaluation," Energies, vol. 12, 2019, pp. 1-33.

Gardarsdottir et al., "Comparison of Technologies for $CO_2$ Capture from Cement Production—Part 2: Cost Analysis," Energies, vol. 12, 2019, pp. 1-20.

Jang et al., "Review on recent advances in $CO_2$ utilization and sequestration technologies in cement-based materials," Construction and Building Materials, vol. 127, 2016, pp. 762-773.

Nwabara et al., "Durable Cathodes and Electrolyzers for the Efficient Aqueous Electrochemical Reduction of $CO_2$," ChemSusChem, vol. 13, 2020, pp. 855-875.

Chen et al., "Progress toward Commercial Application of Electrochemical Carbon Dioxide Reduction," Chem, vol. 4, Nov. 8, 2018, pp. 2571-2586.

Andrew, R., "Global $CO_2$ emissions from cement production, 1928-2018," Earth System Science Data, vol. 11, 2019, pp. 1675-1710.

IEA, "Technology Roadmap Low-Carbon Transition in the Cement Industry," International Energy Agency, 2018, 66 pages.

Schneider, J., "Decarbonizing construction through carbonation," Proceedings of the National Academy of Sciences, Jun. 9, 2020, vol. 117, No. 23, pp. 12515-12517.

Sandalow et al., "ICEF Industrial Heat Decarbonization Roadmap," Innovation for Cool Earth Forum, Dec. 2019, 75 pages.

The National Academies Press, "Negative Emissions Technologies and Reliable Sequestration: A Research Agenda," National Academy of Sciences, 2019, 511 pages.

EPA, "Inventory of U.S. Greenhouse Gas Emissions and Sinks: 1990-2018, Chapter 4: Industrial Processes and Product Use" United States Environmental Protection Agency, Apr. 13, 2020, retrieved from https://www.epa.gov/ghgemissions/inventory-us-greenhouse-gas-emissions-and-sinks-1990-2018.

Khraisheh et al., "An overview on trace $CO_2$ removal by advanced physisorbent materials," Journal of Environmental Management, vol. 255, 2020, 11 pages.

Campbell et al., U.S. Appl. No. 62/682,729, filed Jun. 8, 2018.
Campbell et al., U.S. Appl. No. 16/435,131, filed Jun. 7, 2019.
Campbell et al., U.S. Appl. No. 62/524,329, filed Jun. 23, 2017.
Campbell et al., U.S. Appl. No. 16/706,526, filed Dec. 6, 2019.
Campbell et al., U.S. Appl. No. 62/457,087, filed Feb. 9, 2017.
Campbell et al., U.S. Appl. No. 16/482,215, filed Jul. 30, 2019.
Worsley et al., U.S. Appl. No. 15/159,681, filed May 19, 2016.
Department of Energy, "Hydrogen Production: Electrolysis," Office of Energy Efficiency & Renewable Energy, U.S. Department of Energy, 2020, 5 pages, retrieved from https://www.energy.gov/eere/fuelcells/hydrogen-production-electrolysis on Dec. 2, 2020.

* cited by examiner

SEPARATION AND CONVERSION OF CARBON DIOXIDE TO SYNGAS USING A POROUS CERAMIC DUAL MEMBRANE IN A THERMO-ELECTROCHEMICAL REACTOR

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to carbon capture technology, and more particularly, this invention relates to separation and conversion of carbon dioxide to syngas using a porous ceramic dual phase membrane in a thermo-electrochemical reactor.

BACKGROUND

Reducing carbon emissions and developing negative emissions technology is necessary to slow the rate of climate change. In 2018, 22% of United States greenhouse gas emissions, the majority of which is carbon dioxide ($CO_2$), were attributed to industrial emitters, such as cement plants, steel plants, and the chemical industry. Decarbonizing the cement industry has been identified as an important area for reducing global emissions due to the relatively high concentration of $CO_2$ in the flue gas and the expected continued growth in demand for cement over the next several decades. In particular, cement plants contribute over 5% of global $CO_2$ emissions annually (2 gigatons (Gt) per year). Cement manufacture emits $CO_2$ in all stages of the process, including when calcium carbonate ($CaCO_3$) is heated to produce lime and $CO_2$, as well as indirectly through the burning of fuels for heat. The direct $CO_2$ emissions from cement manufacturing can be reduced through using alternative fuels and raw materials, but these strategies can only partially reduce the total emissions. Depending on the raw materials and process used, some cement plants consume 3 to 6 gigajoules (GJ) of fuel per ton of clinker produced. While substitution of lower carbon-intensity fuel could have significant impact in the cement sector, this solution may not be cost-effective in large quantities and can only partially reduce total emissions. Thus, carbon capture, utilization, and storage (CCUS) is an important option for reducing emissions from cement production.

The benchmark carbon capture technology is absorption into amine solutions, though others have proposed other post-combustion technologies suitable for high concentration point sources, such as absorption into chilled ammonia or membrane-assisted liquefaction. However, these technologies all require cooling the flue gas to room temperature or below. This process is particularly inefficient because the energy in the flue gas is lost, and additional energy must be put back into the capture media for regeneration and release of the $CO_2$, thereby resulting in an energy-inefficient system. Furthermore, despite capturing over 90% of the $CO_2$ directly emitted by the cement plant, the actual avoided emissions can be as low as 65% due to the emissions associated with energy during capture and solvent regeneration.

Furthermore, the $CO_2$ must be compressed prior to geologic sequestration or conversion into other products. Recent efforts have focused on separate strategies to develop carbon utilization technologies in order to transform the captured $CO_2$ into valuable products. Unfortunately, most of these capture or conversion processes are discrete, have large infrastructure footprints, and have correspondingly high capital costs.

It would be desirable to combine carbon absorption and conversion steps into one unit of $CO_2$ reactive capture in order to eliminate the need for desorption and compression of a high-concentration $CO_2$ stream and provide opportunities for more distributed and flexible carbon management. Current efforts in reactive capture suffer from major drawbacks including short operating lifetimes and catalyst degradation, use of expensive catalysts in batch processes (in contrast to a continuous process), oxidative degradation of anodes; notable toxicity of components; and undesired carbon buildup on the electrodes. Overcoming these drawbacks to develop a platform for simultaneous capture and transformation of $CO_2$ into multiple valuable products could dramatically change management of cement industry emissions.

Membrane gas separation has been shown to be a desirable alternative to amine gas treatment. Membrane separation may use much less energy than amine gas separation because membrane gas separation process is spontaneously driven by the difference in $CO_2$ partial pressure on either side of the membrane. In particular, dual-phase membranes infilled with molten hydroxide have shown efficient capture of $CO_2$, as disclosed in U.S. patent application Ser. No. 16/482,215, which is hereby incorporated by reference.

One desirable application of a dual phase membrane for absorbing $CO_2$ gas includes transforming captured $CO_2$ into valuable products. Unfortunately, most of these capture or conversion processes operate as discrete steps and have large infrastructure footprints with corresponding high capital costs. Many capture processes are tailored to specific emission conditions (e.g., fossil power plant flue gas); most conversion techniques are restricted to ultra-high purity $CO_2$ to prevent catalyst poisoning, which limit the ability of these technologies to address the multi-scale and distributed nature of carbon emissions.

New approaches are needed to reduce the infrastructure requirements and increase the flexibility of carbon capture and conversion technology. Carbon Capture by Reactive Absorption (CCRA) techniques, also known as reactive capture (RC), combine carbon absorption and conversion steps into one device and provide opportunity for more distributed and flexible carbon management. To date, there are only a few examples of attempted integration of carbon absorption and conversion within the same device. Of these demonstrations, almost all suffer from significant drawbacks including short operating life-times, use of toxic or expensive catalysts, high temperature (>500° C.) operation, and undesired carbon buildup on electrodes.

It would be desirable to develop carbon remediation strategies that combine carbon dioxide ($CO_2$) capture and conversion—termed reactive capture—in order to reduce the costs involved moving to an economy where the carbon products are fully recycled.

SUMMARY

In one embodiment, a thermo-electrochemical reactive capture apparatus includes an anode and a cathode, wherein the anode includes a first catalyst, wherein the cathode includes a second catalyst, a porous ceramic support positioned between the anode and the cathode, an electrolyte mixture in pores of the ceramic support, and a steam flow system on an outer side of the cathode. The outer side of the cathode is opposite an inner side of the cathode and the inner side of the cathode is adjacent to the ceramic support. In addition, the electrolyte mixture is configured to be molten at a temperature below about 600° C.

In another embodiment, a method for producing syngas includes directing a gas stream along an anode, applying a voltage differential across the anode and the cathode, sweeping an outer side of the cathode with steam, and generating a syngas at the cathode, the syngas including carbon monoxide gas and hydrogen gas. An inner side of the anode is adjacent to a dual phase membrane including a ceramic support infiltrated with a molten electrolyte mixture and the dual phase membrane is sandwiched between the anode and a cathode. The inner side of the cathode is adjacent to the dual phase membrane. In addition, at least the cathode includes a catalyst.

Other aspects and advantages of the present invention will become apparent from the following detailed description, which, when taken in conjunction with the drawings, illustrate by way of example the principles of the invention.

DETAILED DESCRIPTION

Figure 1:
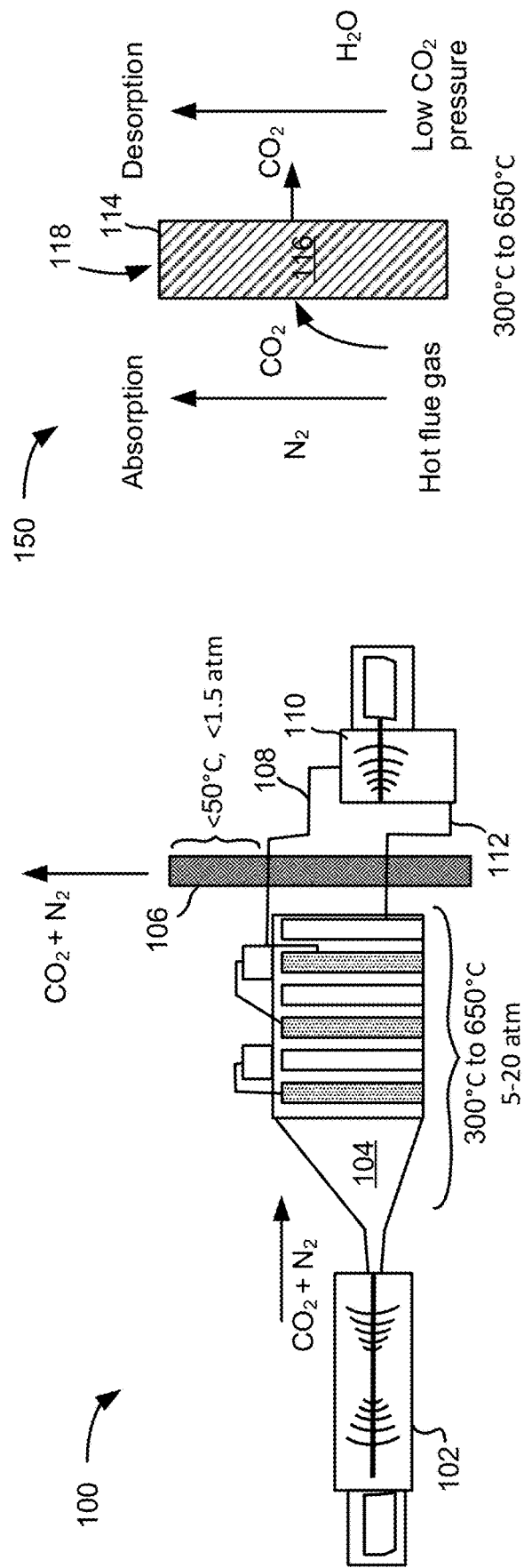
FIGS. 1A and 1B are schematic diagrams of a reversible $CO_2$ absorption by molten hydroxides above 250° C. in the presence of water vapor, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is noted that ambient room temperature may be defined as a temperature in a range of about 20° C. to about 25° C.

It is also noted that, as used in the specification and the appended claims, wt. % is defined as the percentage of weight of a particular component is to the total weight of the mixture. Moreover, mol % is defined as the percentage of moles of a particular component is to the total moles of the mixture.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The following description discloses several inventive concepts for combined separation and conversion of diluted $CO_2$ to syngas using a porous ceramic structure/sorbent solution in a thermo-electrochemical reactor, and/or related systems and methods.

In one general embodiment, a thermo-electrochemical reactive capture apparatus includes an anode and a cathode, wherein the anode includes a first catalyst, wherein the cathode includes a second catalyst, a porous ceramic support positioned between the anode and the cathode, an electrolyte mixture in pores of the ceramic support, and a steam flow system on an outer side of the cathode. The outer side of the cathode is opposite an inner side of the cathode and the inner side of the cathode is adjacent to the ceramic support. In addition, the electrolyte mixture is configured to be molten at a temperature below about 600° C.

In another general embodiment, a method for producing syngas includes directing a gas stream along an anode, applying a voltage differential across the anode and the cathode, sweeping an outer side of the cathode with steam, and generating a syngas at the cathode, the syngas including carbon monoxide gas and hydrogen gas. An inner side of the anode is adjacent to a dual phase membrane including a ceramic support infiltrated with a molten electrolyte mixture and the dual phase membrane is sandwiched between the anode and a cathode. The inner side of the cathode is adjacent to the dual phase membrane. In addition, at least the cathode includes a catalyst.

A list of acronyms used in the description is provided below.
3D Three dimensional
$Al_2O_3$ Alumina, aluminum oxide
AM Additive manufacturing
C Celsius
$CeO_2$ Cerium(IV) oxide
12Ce-TZP 12 mol % $CeO_2$ tetragonal $ZrO_2$ polycrystal
CCRA Carbon Capture by Reactive Absorption
CCS Carbon capture and storage
CO carbon monoxide
$CO_2$ Carbon dioxide
$CO_2R$ carbon dioxide reduction
$CO_3^{2-}$ carbonate
F-T Fischer-Tropsch
GC gas chromatography
GJ gigajoule
$H_2$ Hydrogen gas
HCDP Hydroxide ceramic dual-phase
HER hydrogen evolution reaction
IL Ionic liquids
KOH Potassium hydroxide
LiOH Lithium hydroxide
(LiNaK)OH Mixture of equimolar amounts of LiOH/NaOH/KOH mol % mole percent
NaOH Sodium hydroxide
nm nanometer
OER oxygen evolution reaction
ORR oxygen reduction reaction
ppm parts per million
RC reactive capture
RHE reverse hydrogen electrode
$SiO_2$ Silicon oxide
$SnO_2$ Tin oxide
T Temperature
$TiO_2$ Titanium dioxide
U applied potential
μm micron, micrometer
wt. % weight percent
3Y-TZP 3 mol % $Y_2O_3$-doped $ZrO_2$, yttria tetragonal zirconia polycrystal
8YSZ 8 mol % $Y_2O_3$-doped $ZrO_2$, yttria fully stabilized zirconia
$ZrO_2$ Zirconium oxide Many drawbacks exist in efforts to employ a method of electrochemical conversion of $CO_2$ into syngas and other products, and further, a significant gap remains in achieving these results using industrial sources of $CO_2$. The vast majority of $CO_2$ electroreduction require pure $CO_2$ gas as a reactant; consequently, these technologies are incompatible with carbon capture technologies. Furthermore, these systems have been designed to be highly selective for CO thereby preventing the effluent stream from achieving the desirable ratio of $H_2$ to CO. Since many electrolyzers depend on $CO_2$ solubility into aqueous electrolytes, the concentration of $CO_2$ is very low; and consequently, very few electrolyzers demonstrate >20% single pass conversion of $CO_2$.

According to various embodiments, an apparatus performs an electrochemical conversion that may be tailored to a desired ratio and quantity of products for syngas ($CO+H_2$) generation. Moreover, various embodiments demonstrate an ability to utilize real sources of $CO_2$ as a reactant. In addition, various embodiments described herein avoid a flue gas cooling step and integrate the capture process with $CO_2$ conversion into liquid fuels and are thereby useful for displacing fossil fuels and reducing the emissions associated with the cement manufacturing process.

According to various embodiments, a device may selectively remove $CO_2$ from dilute source streams (e.g., power plant flue gas, bio-gas, co-produced $CO_2$ with natural gas, air, etc.) and convert it directly to a valuable chemical feedstock in a single device in a single step. In an exemplary approach, a device may selectively remove $CO_2$ from dilute source streams and convert it directly to syngas ($CO+H_2$) in a single device in one step. The device as described herein allows a direct conversion of flue gas to syngas.

According to one embodiment, successful demonstration of the proposed thermo-electrochemical reactor may establish a reactive capture platform with flexibility in its $CO_2$ source streams and an ability to produce value-added products, such as syngas from waste streams. In preferred multi-disciplinary approaches, a system may be developed of modular thermo-electrochemical reactors with the potential to produce easily transportable liquid hydrocarbons and to integrate into existing plant infrastructure. For example, an integrated thermo-electrochemical reaction device may separate carbon dioxide ($CO_2$) and electrochemically convert it to valuable syngas ($CO+H_2$) as a feedstock for Fischer-Tropsch (F-T) fuel production.

According to one approach, a system incorporates two technologies, $CO_2$ capture and electrocatalysis, by building a modular thermo-electrochemical reactive-capture apparatus to separate $CO_2$ from flue gas, e.g., cement manufacturing flue gas, and electrochemically convert the absorbed $CO_2$ to valuable syngas ($CO+H_2$). In one approach, an electrocatalytic conversion of $CO_2$ in molten hydroxide media may optimize the electrochemical generation of syngas composition ($CO:H_2$).

According to various embodiments, a reactive capture apparatus has the potential to achieve higher selectivity and conversion performance than existing reactive capture technologies by utilizing an intermediate temperature, dual phase membrane, preferably a membrane of a type: hydroxide-ceramic dual-phase (HCDP) membrane, as disclosed in U.S. patent application Ser. No. 16/482,215, which has been incorporated by reference. As described therein, a HCDP membrane has near-infinite selectivity for $CO_2$ over $N_2$, and in some cases, a $CO_2$ permeability one order of magnitude larger than any dual-phase or polymer membrane reported to date.

As described herein, a reactive capture apparatus may allow selective capture of $CO_2$ from dilute $CO_2$ sources. In one approach, a reactive capture apparatus may allow selective capture of $CO_2$ from $CO_2$ sources in the presence of different co-contaminants (e.g., nitrogen, methane, $NO_x$, $SO_x$, etc.).

In another approach, HCDP membranes may be coupled with electrocatalysts for use in intermediate-temperature anion exchange membrane fuel cells (AEMFCs) using methodology disclosed in U.S. patent application Ser. No. 16/435,131, which is hereby incorporated by reference. As described therein, HCDP membranes coupled with electrocatalysts have demonstrated successful fuel-cell operation at temperatures as low as 200° C. According to various embodiments described herein, adapting the HCDP membranes and thermo-electrocatalysts to operate at temperatures relevant to cement production (200-350° C.) may potentially enable the proposed thermo-electrochemical reactive capture apparatus to harness otherwise wasted energy in hot flue gas streams from cement production and tune the resulting product mixture (e.g., $CO+H_2$) for F-T, other chemical processes, etc.

According to one embodiment, a reactive capture thermo-electrochemical reactor captures $CO_2$ from hot flue gas streams from cement production. The thermo-electrochemical reactor may operate at intermediate temperatures in a range of about 200 to 350° C. by harnessing otherwise wasted energy from the production process. The thermo-electrochemical reactor converts $CO_2$ into valuable syngas thus providing $CO_2$ capture and conversion in one device.

According to one embodiment, an integrated thermo-electrochemical reactor separates $CO_2$ from cement flue gas and electrochemically converts the $CO_2$ to valuable syngas ($CO+H_2$). This approach converts waste $CO_2$ from the cement industry into value-added fuels and may not only reduce $CO_2$ emissions, but also bring additional revenue to the cement industry. Moreover, in a preferred approach a modular reactive capture apparatus may allow integration into an existing plant infrastructure without impacting the overall footprint of the facility.

In a preferred approach, a system includes separation of $CO_2$ from flue gas released during cement production and electrochemical conversion of the captured $CO_2$ to valuable syngas ($CO+H_2$). Cement flue gas typically comprises 14 to 33% $CO_2$ in $N_2$ at temperatures of about 200 to 350° C. In various approaches, a real-time gas effluent characterization with a modeling framework may be developed to provide a foundational understanding of electrocatalytic conversion in molten hydroxide media. Moreover, various approaches may allow prediction of the interplay between thermal and electrochemical "knobs" for optimal balance of $CO_2$ reduction ($CO_2R$) and hydrogen evolution reaction (HER).

Moreover, a system that generates syngas provides a versatile chemical building block that may be integrated with Fischer-Tropsch (F-T) fuel production that converts syngas into liquid hydrocarbons, such as synthetic lubrication, synthetic fuel, etc.

FIG. 1A is a schematic drawing of a system 100 of a source of $CO_2$ in flue gas, shown as a combined-cycle natural gas power plant. As shown, in some systems, the exhaust from a combustion turbine 102, including primarily $CO_2$, $N_2$, and water vapor, flows into a heat exchanger 104. The heat exchanger 104 heats water to produce steam 108 that powers a steam turbine 110 and which is then condensed to liquid water 112 in a closed loop. The heat exchanger 104 removes heat from the flue gas (which exits the combustion turbine at 300° C. to 650° C.) cooling the gases for release via a release stage 106 at less than 50° C. Conventional carbon capture methods involve capturing the carbon at the release stage 106. However, cold $CO_2$ separation at temperatures lower than 50° C. with atmospheric pressure less than 1.5 atm tend to be energetically inefficient. It would be desirable to develop a separation membrane process that could operate along with the heat exchanger, or inside the heat exchanger 104 when the gases are at high temperatures of 300° C. to 650° C. with a pressure of 5 to 20 atm, or in preferred cases, before the gases enter the heat exchanger.

FIG. 1B shows a schematic diagram of a dual phase membrane process 150 of absorption and desorption of $CO_2$ using a dual phase membrane 118 that includes molten hydroxide 116 in a porous support 114. The hot flue gas includes $N_2$, $CO_2$, etc. that upon contacting the membrane 118, the $CO_2$ may be selectively absorbed by the molten hydroxide 116 according to Equation 1.

$$2OH^- + CO_2 \rightarrow CO_3^{2-} + H_2O \qquad \text{Equation 1}$$

The $CO_2$ absorbed by the molten hydroxide 116 in the porous support 114 may be transported across the membrane 118 (e.g., by migration, driven by a concentration gradient effects, etc.) and desorbed in a desorption step of Equation 2, thereby demonstrating a reversible reaction of the $CO_2$ with molten hydroxide 116 of the porous support 114.

$$CO_3^{2-} + H_2O \rightarrow 2OH^- + CO_2 \qquad \text{Equation 2}$$

The desorption step of Equation 2 may be initiated by low $CO_2$ pressure and steam to release $CO_2$ from the membrane on the sweep side of the porous support 114.

As shown in FIG. 1B, use of steam ($H_2O$) as a sweep gas and the dual membrane essentially eliminates a need for applying a pressure gradient and thus reduces energy consumption associated with separation of offensive and/or acidic gases from gas mixtures such as flue gas. For instance, in one embodiment water vapor may be passed across the permeate side of the membrane. The permeate side is opposite the side adjacent to the flue gas, where offensive and/or acidic gases may be present in high concentration. Optionally, but advantageously, the sweep gas may apply pressure to the permeate side of the membrane.

Moreover, using a sweep gas such as water, steam, etc. initially pushes the equilibrium of Equation 2 to favor $CO_2$ release on the permeate side of the membrane, the sweeping action maintains a larger $CO_2$ gradient across the membrane than a vacuum, with less energy. Typically, steam is already present and available in various suitable applications, such as power plants (where steam is used in the heat exchanger), obviating the need to provide external sources of steam and further improving energy efficiency of separation. In addition, water vapor can be easily separated from the $CO_2$ after gas separation (e.g. via condensation), which further allows advantageous harvesting of heat from the water vapor. Accordingly, a faster movement of acid gases across the membrane may desirably minimize infrastructure quantity and cost of the overall separation process/solution.

A continuous process of separating gases preferably includes contacting the gases with the molten hydroxide in the formed ceramic structure such that the dual-phase, molten salt membrane may function as a continuous operation of feed side/sweep side (e.g. permeate and retentate sides) for efficient $CO_2$ gas capture and release. The feed side of the dual-phase, molten salt membrane includes contacting a gas mixture with the membrane (e.g. molten hydroxide of the porous ceramic structure).

A dual-phase, molten salt membrane, e.g., a HCDP membrane, may selectively react with the $CO_2$ of the gas mixture and transport the $CO_2$ across the membrane to the sweep side of the membrane thereby resulting in a pure stream of $CO_2$ on the sweep side. In various approaches, the dual-phase, molten salt membrane may be tuned to separations of specific gases by using different salt mixtures, sweep gas, operating conditions, etc.

As described herein, a HCDP membrane may be modified to include electrocatalysts, an applied voltage differential and continued, higher concentration of steam to push the equilibration of additional electrochemical reactions to generate valuable products from captured $CO_2$.

Figure 2:
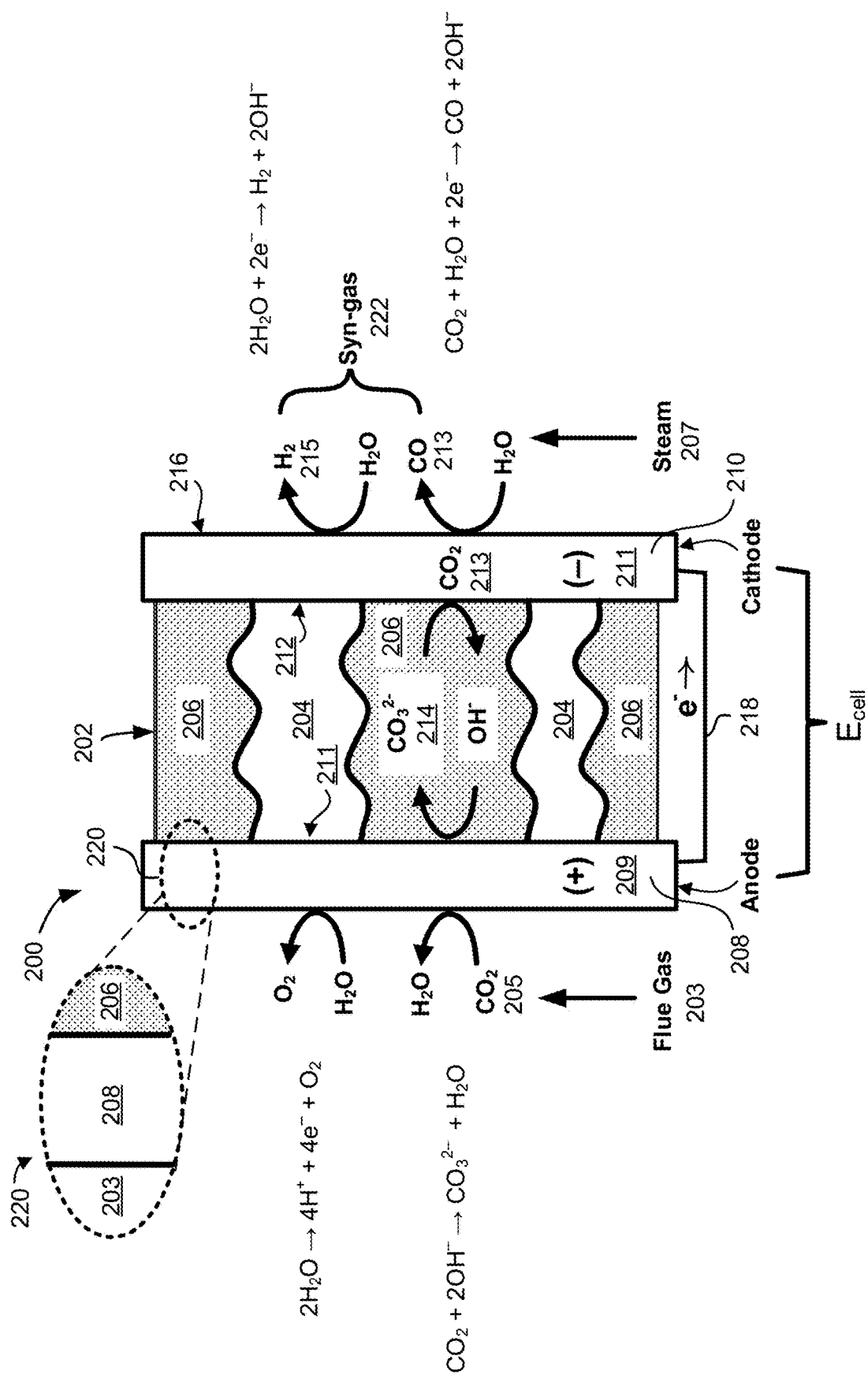
FIG. 2 is a schematic drawing of a thermo-electrochemical reactive capture device, according to one embodiment.

FIG. 2 depicts a thermo-electrochemical reactive capture apparatus 200 including a porous ceramic structure for thermo-electrochemical reactions, in accordance with one embodiment. As an option, the present apparatus 200 may be implemented in conjunction with features from any other embodiment listed herein, such as those described with reference to the other FIGS. Of course, however, such apparatus 200 and others presented herein may be used in various applications and/or in permutations which may or may not be specifically described in the illustrative embodiments listed herein. Further, the apparatus 200 presented herein may be used in any desired environment.

According to one embodiment, a thermo-electrical reactive capture apparatus 200 of FIG. 2 includes an anode 208 and a cathode 210, where the anode 208 includes a first catalyst and the cathode 210 includes a second catalyst. The thermo-electrochemical reactive capture apparatus is configured to capture and transport $CO_2$ to a cathode 210 where syngas 222 is generated. The thermo-electrical capture apparatus is configured as an electrolysis-type device, where electricity is used to split water into hydrogen and oxygen.

The apparatus 200 includes a porous ceramic support 204 positioned between the anode 208 and the cathode 210. The thermo-electrochemical reactive capture apparatus includes an electrolyte mixture in pores of the ceramic support. In an exemplary approach, the porous ceramic support with the hydroxide mixture therein is a hydroxide ceramic dual phase (HCDP) membrane. The electrolyte mixture may be configured to be molten at a temperature below about 600° C. In some approaches, the melting point may be dependent upon the electrolyte used, as would be readily determinable by one skilled in the art upon reading the present disclosure.

In various approaches, the electrolyte mixture of the HCDP membrane is characterized as including a hydroxide mixture when molten, where the hydroxide mixture includes an alkaline hydroxide having a melting point below 200° C.

As illustrated in in the schematic drawing of the apparatus 200, the HCDP membrane 202 includes a porous ceramic support 204 having molten hydroxide 206 retained in its pores. The HCDP membrane 202 is positioned between an anode 208 and a cathode 210. A voltage differential 218 may be applied across the anode 208 to the cathode 210, and the extent of the voltage differential may be adjusted for adjusting the electrochemical reaction rates.

As shown in FIG. 2, $CO_2$ 205 from a flue gas 203 is absorbed by the molten hydroxide 206 on one side 212 of the HCDP membrane 202 to produce carbonate $CO_3^{2-}$ 214 in the molten hydroxide 206 within the porous ceramic support 204 of the HCDP membrane 202. The carbonate $CO_3^{2-}$ 214 is then transported to the opposite side 212 of the HCDP membrane 202 which is adjacent to the cathode 210. At the cathode 210, the carbonate $CO_3^{2-}$ 214 reacts (e.g., contacts with) the steam 207 that flows on the outer side 216 of the cathode 210. The reaction of carbonate $CO_3^{2-}$ 214 with steam 207 converts the carbonate $CO_3^{2-}$ 214 back to concentrated $CO_2$ 213. In one approach, the concentrated $CO_2$ 213 may remain captured on the cathode 210.

The apparatus 200 includes a steam flow system 207 on an outer side 216 of the cathode 210. The outer side 216 of the cathode 210 is opposite an inner side 212 of the cathode 210 and the inner side 212 of the cathode 210 is adjacent to the porous ceramic support 204. In one approach, the steam flow system may include an inlet for steam. In another approach, the steam flow system may include a barrier, nozzle, etc. for directing steam along the cathode. As noted above, steam from or created by another process is preferably utilized. However, in yet another approach, the steam flow system may include a steam source, such as a boiler.

The anode and cathode participate as electrocatalysts in the system. The anode and cathode are preferably porous. In preferred approaches, the material of the anode and cathode is stable and efficient in a molten hydroxide environment (e.g., be resistant to corrosion). In preferred approaches, the first catalyst of the anode may be configured for oxygen evolution reaction (OER) and the second catalyst of the cathode may be configured for hydrogen evolution reaction (HER). In preferred approaches, the electrocatalysts, e.g., anode 208 and cathode 210, may be comprised of material 209, 211 respectively, generally understood to participate in hydrogen evolution reaction (HER) and oxygen evolution reaction (OER). Electrocatalysts (e.g., first and/or second catalysts) may include materials such as precious metals such as platinum (Pt) group metals such as Pt, rhodium (Rh), iridium (Ir), ruthenium (Ru), osmium (Os), palladium (Pd); noble metals such as gold (Au), silver (Ag), etc.; transition metals such as nickel (Ni), copper (Cu), iron (Fe), zinc (Zn), chromium (Cr), manganese (Mn), mercury (Hg), scandium (Sc), cobalt (Co), molybdenum (Mo), etc.; alloys of transition metals (e.g., nickel cobalt alloys, nickel chrome alloys), mixtures of transition metals, mixed metal oxides such as iridium oxide, ruthenium oxide, cerium oxide, other perovskite materials ($ABO_3$), etc. In some approaches, electrocatalysts may include high entropy alloy combinations of platinum group metals and transition metal candidates. For example, for oxygen reduction reactions (ORR) high entropy alloy combinations include PtIrOsRuCu, PtCuNiMnAl, etc. For oxygen evolution reactions (OER), high entropy alloy combinations include IrMoNiCoAl, etc. For $CO_2$ reduction reactions ($CO_2R$) high entropy alloy combinations include AuPtAgPdCu, etc. In some approaches, a combination of precious metals with additives may reduce electrode catalyst cost. For example, electrocatalysts may be comprised of layers of materials for optimal reactivity, efficiency, and lowered cost.

In some approaches, the anode and/or cathode may include electrode material such as metal mesh, carbon material, metal particles, etc. In some approaches, the anode and/or cathode may include a combination of different electrode materials. In some approaches, the electrode material may be a catalyst, for example, a mesh comprised of nickel.

In some approaches, the material of the first catalyst of the anode and the material of the second catalyst of the cathode may be the same. In another approach, the material of the first catalyst of the anode is different than the material of the second catalyst of the cathode in some respect, such as in composition, in ratios of materials, etc. In some approaches, the first and/or second catalyst may be a portion of the material of the anode and/or cathode, respectively. In one approach, the first and/or second catalyst may comprise at least 5 weight. % (wt. %) of the total weight of the material comprising the anode and/or cathode, respectively. The first and/or second catalyst is preferably positioned as an outermost layer of the anode and/or cathode. In one approach, the material of the anode is comprised of 100 wt. % of the first catalyst. In one approach, the material of the cathode is comprised of 100 wt. % of the second catalyst.

In one approach, the material 211 of the cathode 210 may include a catalyst configured for a carbon monoxide (CO) reduction reaction. In various approaches, adding electrodes (e.g., anode 208, cathode 210) comprising catalysts (e.g., electrocatalysts) to the HCDP membrane 202 allows captured $CO_2$ 213 at the cathode 210 to be reduced to generate CO 213. In one approach, the cathode may be configured to generate syngas ($CO+H_2$) upon energization thereof and contact with carbon dioxide. In one approach, a combination of temperature of the molten hydroxide 206 and applied voltage differential 218 may generate components of syngas 222 ($CO+H_2$). The captured $CO_2$ 213 at the cathode 210 reacts with the steam 207 and generates carbon monoxide 213 (CO) according to the $CO_2$ reduction ($CO_2R$) reaction in Equation 3.

$$CO_2+H_2O+2e^-\rightarrow CO+2OH^- \qquad \text{Equation 3}$$

In addition, the steam 207 present in the system will likely also react at the cathode 210 to produce hydrogen gas 215 ($H_2$) according to the hydrogen evolution reaction (HER) in Equation 4.

$$2H_2O+2e^-\rightarrow H_2+2OH^- \qquad \text{Equation 4}$$

The generation of CO (Equation 3) and $H_2$ (Equation 4) may be combined forming syngas 222 ($CO+H_2$).

To complete the electrochemical reaction, oxygen may be generated at the anode according to the oxygen evolution reaction (OER) in Equation 5.

$$2H_2O\rightarrow 4H_2+4e^-+O_2 \qquad \text{Equation 5}$$

In one approach, the thermo-electrochemical apparatus may include a triple phase boundary region that includes three phases present at one location, e.g., solid:liquid:gas. In one approach of the apparatus described herein the triple phase boundary region includes an electrode/catalyst as the solid:an electrolyte as the liquid:a source of $CO_2$ or generation of $O_2$, CO, $H_2$ as the gas. For example, some approaches include an association of the cathode and/or anode, the molten electrolyte mixture, and a gas at one location. For purposes of this disclosure, a triple phase boundary is defined as the region of contact resulting from three different phases present at one location: electrode/catalyst (solid), electrolyte (molten hydroxide as a liquid), and a gas ($CO_2$), steam ($H_2O$), etc. In some approaches, the gas 203, 207, may include at least one of the following: carbon dioxide gas ($CO_2$), steam ($H_2O$), etc. The system may also include other gases from the flue gas, such as nitrogen gas ($N_2$), etc., however these gases do not participate in the thermo-electrochemical reaction and are nonessential gases.

Looking to the expanded oval of a triple boundary region 220, according to various approaches, a triple boundary region 220 at the anode 208 (or cathode 210) may include an association of the anode 208, the molten hydroxide mixture 206, and a gas 203, e.g., $CO_2$. Similarly, a triple boundary region at the cathode 210 may include an association of the cathode 210, the molten hydroxide mixture 206, and a gas, e.g., steam ($H_2O$) 207, on the outer side 216 of the cathode 210.

In various approaches, electrode-membrane assemblies may be prepared to ensure optimal triple phase boundary, for example, by saturating the electrodes with molten hydroxide prior to assembly. The electrochemical reaction of the cell that may be optimized to produce components of syngas ($CO+H_2$), or 02 occurs in the presence of these three phases, thus, the triple phase boundaries may be the active areas of the cell.

According to various approaches, the rate of $CO_2$ conversion to CO and the $CO:H_2$ product ratio may be tuned by the operating conditions. For example, operating conditions that affect the rate of $CO_2$ conversion to CO and the $CO:H_2$ ratio may include temperature, current density, voltage, etc.). In some approaches, the operating conditions may be tailored for specific applications, e.g., follow-on process that will utilize the syngas for chemical production.

According to various embodiments, two key mechanistic phenomena may be demonstrated in the molten hydroxide environment of the thermo-electrical reactive capture device: diffusion of carbonate to the cathode surface and reduction of $CO_2$ to CO.

Characteristics of the HCDP Membrane

According to one embodiment, the device includes an HCDP membrane having a porous ceramic structure infilled with molten electrolyte. Methodology of forming the HCDP membrane is disclosed in U.S. patent application Ser. No. 16/482,215, which has been incorporated by reference. For purposes of the present disclosure, the HCDP membrane includes a porous ceramic 3D structure that supports molten liquid salts, e.g., molten sodium hydroxide, at temperatures above room temperature (e.g., (e.g. between about 20° C. and 25° C.) to temperatures as high as 1000° C.

According to one embodiment, the HCDP membrane is a porous ceramic structure having an open cell structure with a plurality of pores, where the pores connect to form continuous channels through the ceramic structure from one side of the ceramic structure to an opposite side of the ceramic structure. Moreover, the porous ceramic structures supports a liquid phase that is confined in the pores by capillary forces. Preferably, the average pore size is such that the liquid phase substantially remains in the pores under conditions corresponding to the intended use of the resulting product. Furthermore, the porous ceramic structure infilled with a liquid may function as a membrane to selectively transport materials (e.g. $CO_2$) from one side of the membrane to the other.

According to various approaches, the ceramic structure may include alumina ($Al_2O_3$), yttria fully stabilized zirconia (8 mol % $Y_2O_3$-doped $ZrO_2$ (8YSZ)), tetragonal zirconia polycrystal (3 mol % $Y_2O_3$-doped $ZrO_2$ (3Y-TZP)), $CeO_2$, 12 mol % $CeO_2$ tetragonal $ZrO_2$ polycrystal (12Ce-TZP), $ZrO_2$, $SiO_2$, $TiO_2$, $SnO_2$, etc. In preferred approaches, the ceramic structure may include 3 mol % $Y_2O_3$-doped $ZrO_2$. In other preferred approaches, the ceramic structure may include 8 mol % $Y_2O_3$-doped $ZrO_2$.

In some approaches, the porous ceramic structure may have pores having an average diameter sufficient to retain liquid by capillary action. In some approaches, the porous ceramic structure may have pores having an average diameter in a range of about 50 nm to about 500 nm, but the diameter of the pores may be lower or higher. In some approaches, the porous ceramic structure may have pores having an average diameter in a range from approximately 75 nm to about several (e.g. 10) microns. As will be understood by persons having ordinary skill in the art upon reading the present descriptions, in some aspects of the present invention, larger pore size is desirable to facilitate rapid mass transport through the membrane, but pores must be sufficiently small to retain the molten hydroxide phase within the matrix when subjected to the pressure gradient generated within the separation environment. In preferred approaches, the porous ceramic structure may have pores having an average diameter in a range of about 50 nm to about 300 nm.

Furthermore, pores may have an average diameter in a range from about 10 nm to about 1 mm, from about 100 nm to about 100 μm, from about 100 nm to about 10 μm, from about 200 nm to about 5 μm, or in a range from about 200 nm to about 1 μm, in various embodiments. As will be appreciated by skilled artisans upon reading the present disclosures, in preferred approaches, the pore size is critical to retention of hydroxide in pores of the porous support structure under a given pressure gradient.

In addition to developing the hydroxide chemistry, operational conditions for $CO_2$ absorption, and generation of syngas, the porous ceramic support material may maintain the highly caustic molten phase in the pores against model differential pressure. Methodology is disclosed in U.S. application Ser. No. 16/435,131, which has been incorporated by reference. In brief, the method of fabricating a porous support ceramic membrane (e.g., HCDP membranes) is highly scalable and compatible with additive manufacturing (e.g. three-dimensional (3D) printing) methods such as direct ink writing (DIW) and projection micro-stereolithography (PμSL). In various approaches, the ceramic support (e.g., membrane, HCDP membrane, etc.) has physical characteristics of formation by an additive manufacturing technique. In various approaches, physical characteristics may include filaments arranged in a geometric pattern, a patterned (e.g., wavy, sinusoidal, ordered, etc.) outer surface defined by stacking filaments, a defined porosity (e.g., ordered, controlled, non-random, etc.), a porosity having pores with measurable average diameters, etc. Thus, using these additive manufacturing techniques allows engineering of parts and production of optimal geometry for efficient mass transport and mechanical strength.

In some embodiments, the density of the porous ceramic structure may be in a range of about 20% to about 50% of a density of a solid ceramic form but could be higher or lower. In a preferred approach, the density of the porous ceramic structure may be in a range of about 20 wt. % to about 50 wt. % of a density of a solid ceramic form having the same composition as the porous ceramic structure. In some approaches, sintering the structure at higher temperature conditions may result in a density of the porous ceramic structure in a range of about 45 wt. % to about 85 wt. % of a density of a solid ceramic form.

According to various embodiments, the HCDP membrane having a porous ceramic support is infilled with an electrolyte inorganic base mixture having a high solubility of $CO_2$, such as sodium hydroxide, potassium carbonate, sodium borate, sodium phosphate, any of many other inorganic solvents that are bases in the sense of acid-base reactions, etc.

In some approaches, the HCDP membrane includes a porous ceramic structure filled with an electrolyte mixture that is molten in use. In preferred approaches, the electrolyte mixture is a hydroxide mixture that is characterized as having at least one cation from the following: lithium, sodium, potassium, cesium, rubidium, etc. In an exemplary approach, the hydroxide mixture may include potassium hydroxide. For example, the porous ceramic structure may be infilled with a mixture of molten hydroxides, e.g. (LiNaK)OH.

As described, the HCDP membrane includes a porous ceramic structure that retains molten hydroxide in extreme conditions with long term stability, such as high temperatures over an extended period of time. In some approaches, the ceramic structure has physical characteristics that enables the ceramic structure to retain molten hydroxide in the pores at high temperatures (e.g. 400° C.) for as long as 17,520 hours (i.e. 2 years).

Optimize HCDP Membrane Thickness

According to one approach, different concentrations of $CO_2$ at the surface of the membrane may demonstrate different absorption rates, e.g., different sources of flue gas may have different concentrations of $CO_2$. Bulk $CO_2$ concentrations may and lower $CO_2$ concentrations in the flue gas interact differently at the surface of the HCDP. For instance, as the $CO_2$ from the flue gas starts to be absorbed into the membrane, a diffusion layer may be created from the bulk concentration to the HCDP membrane surface. For optimal absorption into the HCDP membrane, a physical design of the membrane may be tuned according to a concentration of $CO_2$ for a given source of flue gas. In one approach, a thickness of the HCDP membrane may be critical to increase $CO_2$ permeability. The thickness of the HCDP membrane may correspond to physical characteristics. For example, thinner HCDP membranes may provide higher transport rates, thicker HCDP membranes may provide increased mechanical strength, etc. In some preferred approaches, a thickness of a HCDP membrane may be in a range of between 100 to 250 μm.

$CO_2$ Permeability in the HCDP Membrane and Optimal Temperature

As described herein, the HCDP membrane having a porous ceramic structure is used as a support membrane for a continuous process of separating gases that includes contacting the gases with a molten hydroxide electrolyte retained in the pores of a porous ceramic structure.

According to one embodiment, the composition of hydroxide electrolyte and water content likely influences melting temperature. In various approaches, the HCDP membrane includes a porous ceramic structure infilled with a eutectic mix of NaOH/KOH/LiOH because the eutectic mix of NaOH/KOH/LiOH has a lower melting point and higher solubility of $CO_2$ and carbonate ions $CO_3^{2-}$ thereby allowing the molten hydroxide to remain liquid during a $CO_2$ separation process. In various approaches, the molten electrolyte composition may be reformulated to lower the operational temperature range of the HCDP by managing the carbonate-hydroxide equilibrium and melting temperature. For example, molten electrolyte compositions may be designed to separate $CO_2$ at temperatures below 400° C. In preferred approaches, molten salt formulations and HCDP membranes operate at temperatures about 200° C., for example in a range of about 200 to 350° C.

In some approaches, a mixture of molten hydroxide (e.g. approximately equimolar amounts of NaOH/KOH/LiOH, or amounts in a range as described by the ratios provided below, in various embodiments) provides an exceptional ionic conductivity of 1 S/cm at 300° C. even though the viscosity thereof is in a range of approximately 2-3 centipoise. In another embodiment, the eutectic mixture may include alkali metal hydroxides according to a ratio of 4KOH:4NaOH:MOH. In another embodiment, the mixture may include alkali metal hydroxides according to a ratio of 1KOH:1NaOH:4LiOH. For example, contacting a $CO_2$ gas with molten potassium hydroxide retained in a ceramic structure may result in a $CO_2$ permeance greater than about $2.5 \times 10^{-8}$ mol/m-s-Pa. Moreover, contacting a $CO_2$ gas with molten potassium hydroxide retained in a ceramic structure may result in a $CO_2$ permeability of greater than about 60 $10^{-12}$ mol/m-s-Pa.

In various approaches, the thermo-electrochemical reactive capture apparatus may be operable at a temperature in a range of greater than 150° C. up to about 1000° C. In some approaches, the thermo-electrochemical reactive capture apparatus is operable to generate the syngas at temperatures in a range of 250° C. to about 600° C. In preferred approaches, the thermo-electrochemical reactive capture apparatus is operable to generate the syngas at temperatures in a range of about 150° C. to about 400° C.

In one approach, an apparatus includes a thinner HCDP membrane, a lower melting point hydroxide electrolyte, steam at the cathode side, and a source gas mixture comprising 14 to 33% $CO_2$ in $N_2$) may result in $CO_2$ permeability of at least $5 \times 10^5$ Barrer at temperatures between 200 to 350° C.

Electrocatalysis

According to various embodiments, a heterogeneous electrocatalysis may be performed in aqueous electrolytes under ambient temperature and pressure conditions. Moreover, the presence of a high-temperature molten hydroxide interfacial environment may be explored relative to aqueous interfaces. For instance, underapplied potential and non-ambient temperature conditions, significant restructuring of the hydroxide ions may alter the electric field distribution and impact the activity-selectivity correlations of $CO_2$ reduction and $H_2$ evolution.

In various approaches, once $CO_2$ permeability of the HCDP membrane is optimized to a maximum permeability, electrodes may be added to both sides of the membrane to demonstrate conversion of $CO_2$ to syngas. In some approaches, products of the modular reactive capture apparatus produced at the cathode may be quantified using techniques generally understood by one skilled in the art. For example, amounts of $H_2$ and CO produced at the cathode may be quantified using gas chromatography (GC). In some approaches, an apparatus including an optimized HCDP membrane and modular electro-thermochemical reactor produces greater than 80% faradaic efficiency for CO and HER, and in preferred approaches greater than 95% faradaic efficiency for CO and HER.

According to various approaches, the majority of heterogeneous electrocatalysis may be performed in aqueous electrolytes under ambient temperature and pressure conditions. The presence of a high-temperature molten hydroxide interfacial environment is distinct and underexplored relative to aqueous interfaces. For instance, tuning the applied potential and the non-ambient temperature conditions may allow significant restructuring of the hydroxide ions that in turn may alter the electric field distribution and impact the activity-selectivity correlations of $CO_2$ reduction and $H_2$ evolution. In one approach, optimizing the system may include using a simulation framework to compute distributions of electrolytic ions within the double layer to investigate structure-performance relationships during $CO_2$ reduction in a non-aqueous molten electrolyte.

Optimize Applied Potential

According to one embodiment, a thermal-electrochemical reactive capture apparatus includes a power source for applying a voltage differential across the anode and the cathode. A cell potential $E_{Cell}$ refers to the potential difference between the cathode $E_{cat}$ and the anode $E_{an}$ in the electrochemical cell, as shown in Equation 6:

$$E_{Cell}^0 = E_{an}^0 - E_{cat}^0 \qquad \text{Equation 6}$$

The $E_{Cell}$ is measured in voltage (V), and the values are for reference for a given concentration and pressure, e.g., $E°$ indicates the potentials are when concentrations are 1 M, pressures are 1 bar, and the electrolyte is aqueous. These values are for reference only and may vary for a particular electrolyte mixture of molten hydroxide.

In the reactive capture system as described herein, the cell potential is estimated according to the reverse hydrogen electrode (RHE), or reference electrode. For example, at the anode, the oxidation of water (Equation 5) has a potential of:

$$E_{an}^0 = +1.23 \text{ V vs. RHE}$$

and, at the cathode, the reduction of $CO_2$ to CO (Equation 3) has a potential of:

$$E_{cat}^0 = -0.11 \text{ V vs. RHE}$$

and, at the cathode, the generation of $H_2$ (Equation 4) has a potential of $$E_{cat}^0 = 0 \text{ V}$$

Thus, the cell potential $E_{cell}$ may be approximately $$E_{Cell}^0 = +1.23 \text{ V} - (-0.11 \text{ V}) = \sim 1.5 \text{ V}$$

In various approaches, the voltage V is a total amount of volts that is applied from anode to cathode. In various approaches, the cell potential, $E_{Cell}$, may be in a range of about 0.5 volts to about 3.5 volts and may be higher or lower. In one approach, an upper limit of voltage across the cell, $E_{Cell}$, may be as high as 4 volts. In a preferred approach, the energy potential of the cell $E_{Cell}$ is approximately 1.5 volts. The cell may be configured to generate CO and $H_2$ from absorbed $CO_2$ by applying 1.5 volts across anode and cathode and, in addition, may compensate for extra energy demands in the system.

As described herein, a balance of temperature and applied potential allows more or less volts to be applied to the system. For example, operating the cell at a higher temperature allows application of a lower amount of electricity to drive the electrochemical reactions.

In terms of applied voltage for each electrode, a preferred voltage applied to the cathode, according to the RHE scale, may be in a range of −1 to about −1.2 volts vs. RHE. In some approaches, negative volts below −1.2 volts may not generate increased products, e.g., CO and $H_2$. On the anode, in consideration of the thermodynamic potential at operation to generate syngas at the cathode, the voltage for generating $O_2$ gas at the anode may be in a range of +1 to +2.5 volts and may be higher, in reference to the reverse hydrogen electrode (RHE).

Correlation of Temperature-Applied Potential

In the HCDP membrane, there tends to be a coupling between the temperature and applied potential that affects the rate of diffusion of some of the molecules of the electrolyte mixture toward the cathode or the anode, and also affects the rate of the electrochemical reaction at the anode and/or cathode. According to one embodiment, the interplay between temperature and applied electrical potential may alter the ratio of CO to $H_2$ ($CO:H_2$) produced at the cathode to optimize for integration with F-T fuels production. In various approaches, adjusting temperature and applied potential in a coupled manner may tuned the ratio of CO and $H_2$ being produced. The interplay of temperature and applied potential may be adjusted in concert with each other to optimize the thermodynamics and kinetics of individual electrocatalytic processes and tune the selectivity toward desired products as well as minimize the selectivity toward unwanted side reactions. In various approaches, a thermo-electrochemical Pourbaix diagram (heat versus applied potential) may allow modeling for optimal applied potential and operating temperature for desired electrochemical reactions in the system. In addition, modeling may include a balance between HER ($H_2$ generation) and $CO_2$ hydrogenation/reduction reactions (CO generation).

In various embodiments, using static and dynamic molecular simulations, the correlated impact of temperature (T) and applied potential (U) on the electrocatalytic interfacial properties may tune the reactive mechanisms of $CO_2$ conversion and hydrogen evolution. In an exemplary approach, a thermo-electrochemical apparatus may demonstrate an increased $CO_2$ permeability using a HCDP membrane and $CO_2$ capture and conversion to syngas.

In various approaches, a T-U (temperature-applied potential) control correlation may be tuned to maximize operational efficiency toward the catalyst reactions at the cathode: $CO_2R$ to CO and HER to $H_2$. In one approach, the parameters for optimally efficient $CO_2R$ and HER at the cathode, e.g., temperature (T), applied potential (U), and water-gas shift activity may be defined using a combination of atomistic modeling and thermo-electrochemical experiments.

In various embodiments, an apparatus includes an operational control (e.g., a knob, dial, toggle, etc.) that may tune the CO:H2 ratio of produced gas. In one approach, a variable temperature operation may critically alter the catalytic operation as a coupled function of temperature (T) and applied electrical potential (U). In preferred approaches, the T-U control correlation may provide operational efficiency toward $CO_2R$ and HER at a given T, U, as well as manage activity toward the water-gas shift reaction of Equation 7.

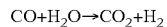

$$CO + H_2O \rightarrow CO_2 + H_2 \qquad \text{Equation 7}$$

In various approaches, syngas composition may be tuned as a function of operating conditions, e.g., temperature, potential, flowrate of $H_2O$, etc. The operating conditions may affect the selectivity of the cathode between the HER (Equation 4) and $CO_2R$ reaction (Equation 3).

Modular Reactive Capture Apparatus

According to one embodiment, a thermo-electrochemical reactor may be a modular reactive capture apparatus. A modular design of the apparatus may allow individual components such as electrodes, HCDP membranes, gasket, etc. to be removed and replaced.

Figure 3:
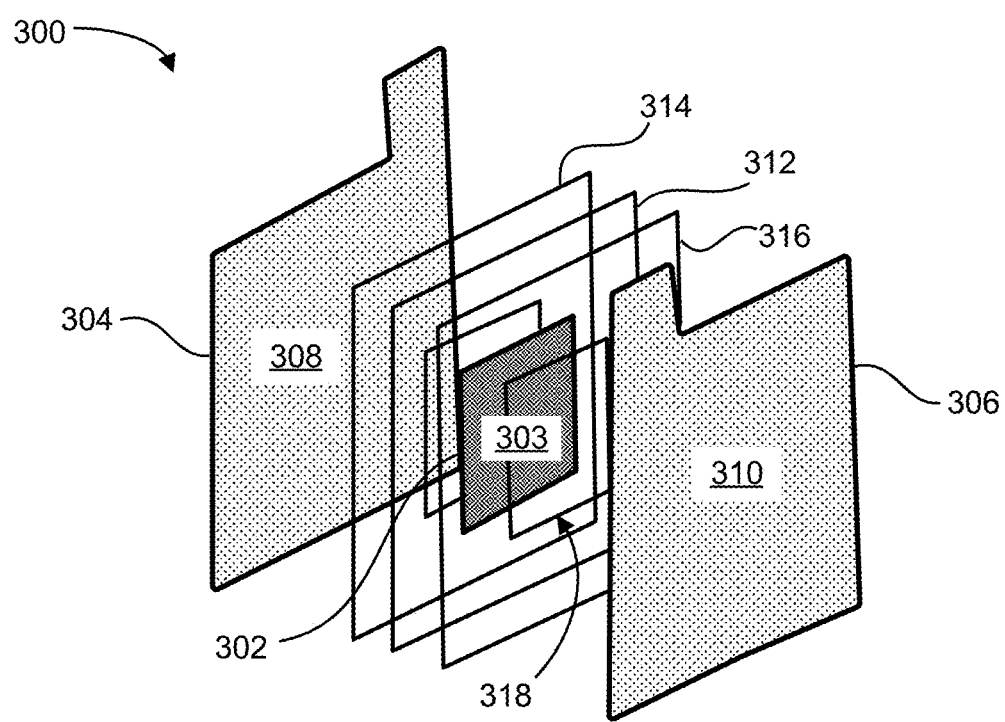
FIG. 3 is a schematic drawing of an expanded view of a thermal-electrochemical reactive capture device, according to one embodiment.

FIG. 3 illustrates a schematic drawing of an expanded view of a modular reactive capture apparatus 300, in accordance with one embodiment. As an option, the present apparatus 300 may be implemented in conjunction with features from any other embodiment listed herein, such as those described with reference to the other FIGS. Of course, however, such apparatus 300 and others presented herein may be used in various applications and/or in permutations which may or may not be specifically described in the illustrative embodiments listed herein. Further, the apparatus 300 presented herein may be used in any desired environment.

As shown in FIG. 3, a modular reactive capture device includes a HCDP membrane 302 that is comprised of a porous ceramic support infilled with molten electrolyte mixture 303. Electrodes are positioned on opposite sides of the HCDP membrane 302. One electrode may be an anode 304 and the opposite electrode may be a cathode 306 for energization of electrochemical reactions in the system. In one approach, the HCDP membrane 302 is positioned in a gasket 312. On either side of the HCDP/gasket 302/312, a gasket 314, 316 may be positioned between the HCDP/gasket 302/312 and the anode 304 and cathode 306. Each gasket 314, 316 has an opening 318 matching the outer dimensions of the HCDP membrane to allow direct contact between the HCDP membrane and the anode 304 and cathode 306.

As described herein, the anode 304 and/or cathode 306 includes material 308, 310, respectively, that includes a catalyst for electrochemical reactions.

In one approach, the HCDP membrane may include a porous ceramic structure that may be acquired commercially, e.g., from a vendor practicing methods of fabricating porous ceramic structures as described elsewhere herein.

In preferred approaches, a HCDP membrane is formed to obtain high $CO_2$ permeability from flue gas generated from cement production. For example, a HCDP membrane optimized for higher $CO_2$ permeability at $CO_2$ concentrations of about 14 to 33% $CO_2$ in $N_2$ and temperatures relevant to cement production (200 to 350° C.). In some approaches, higher $CO_2$ permeability may be demonstrated in the temperature range of 300 to 550° C.). In some approaches, a composition of molten electrolytes may be tuned to provide higher levels of $CO_2$ permeability over a wider range of $CO_2$ concentrations (e.g., as low as 1%) and temperatures in a range of 200 to 350° C.).

Figure 4:
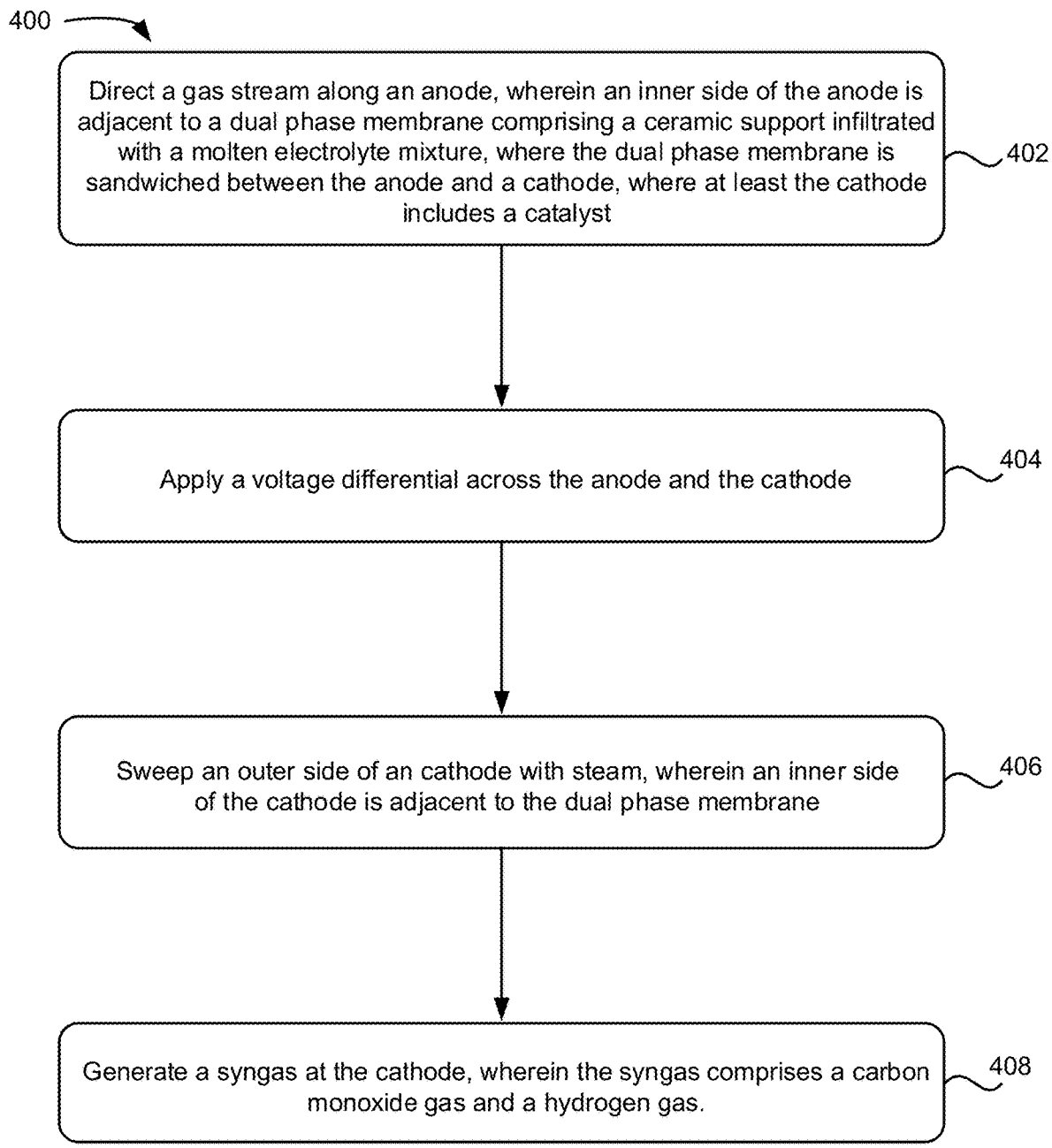
FIG. 4 is a flow chart of a method, according to one embodiment.

FIG. 4 shows a method 400 for producing syngas in accordance with one inventive concept. As an option, the present method 400 may be implemented to produce syngas using a thermo-electrochemical reactive capture apparatus such as those shown in the other FIGS. described herein. Of course, however, this method 400 and others presented herein may be used to provide applications of fuel cells which may or may not be related to the illustrative embodiments listed herein. Further, the methods presented herein may be carried out in any desired environment. Moreover, more or less operations than those shown in FIG. 4 may be included in method 400, according to various embodiments. It should also be noted that any of the aforementioned features may be used in any of the embodiments described in accordance with the various methods.

Operation 402 of method 400 begins with directing a gas stream along an anode, where an inner side of the anode is adjacent to a dual phase membrane including a ceramic support infiltrated with a molten electrolyte mixture. The dual phase membrane is sandwiched between the anode and a cathode. At least the cathode includes a catalyst. In one approach, the anode includes a catalyst.

In some approaches, the gas stream is flue gas that includes $CO_2$. In one approach, the gas stream includes a flue gas that includes such gases as nitrogen gas ($N_2$), $CO_2$, etc. Preferably, the gas stream originates from a source at a high temperature (e.g., greater than at least 150° C. and have a concentration of $CO_2$ greater than at least 10% of total gasses of the gas stream.

In one approach, the flue gas is from a cement source (e.g., cement production plant). In preferred approaches the flue gas includes concentrations of $CO_2$ in a range of greater than 10% to 50% of total gasses in the flue gas composition. In some approaches, the gas stream may include a concentration of $CO_2$ in a range from atmospheric (about 400 ppm) to about 100% $CO_2$.

The dual phase membrane uptakes the gases from the gas stream, e.g., flue gas, $N_2$, $CO_2$, etc. In some approaches, the molten electrolyte mixture includes a molten hydroxide mixture. For example, in one approach, contacting the $CO_2$ and molten hydroxide mixture forms a carbonate, e.g., reducing $CO_2$ to $CO_3^{2-}$.

Operation 404 includes applying a voltage differential across the anode and the cathode. In one approach, the method may be performed with the molten electrolyte mixture at a temperature in a range of 150° C. to about 400° C. In some approaches, the method may be performed at higher temperatures, e.g., as high as 650° C., however higher temperatures above 400° C. tend to be less economically viable.

Operation 406 includes sweeping an outer side of a cathode with steam, where an inner side of the cathode is adjacent to the dual phase membrane. In some approaches, the steam is provided from a steam flow system, as described herein. In preferred approaches, a relative humidity is in a range of about 4.5 wt. % humidity to about 100 wt. % humidity. In some approaches, a relative humidity may include a temperature range between room temperature to greater than 100° C. In some approaches, steam may be defined as water saturated air (e.g., 100% relative humidity) at temperatures less than 100° C. In other approaches, steam may be defined as pure steam/diluted steam at temperatures greater than 100° C. In some approaches, the steam in the steam flow system may be re-used after the $CO_2R$ reaction to be reduced to $H_2$ in the HER reaction.

Operation 408 of method 400 includes generating a syngas at the cathode, where the syngas includes a CO gas and a $H_2$ gas.

The method of using a thermo-electrochemical reactive capture apparatus to forms a syngas includes a series of electrochemical reactions. For example, contacting the carbon dioxide gas (e.g., from the flue gas) and the molten hydroxide mixture of the dual phase membrane forms a carbonate ($CO_3^{2-}$) (Equation 1). The cathode is configured to be a catalyst for reduction reactions. For example, contacting the $CO_3^{2-}$ from the membrane and the steam at the cathode forms $CO_2$ at the cathode (Equation 2). Following formation of $CO_2$ at the cathode, contacting the steam and $CO_2$ at the cathode forms CO (Equation 3) and contacting the steam at the cathode forms $H_2$ (Equation 4).

The anode is configured to be a catalyst for the oxide evolution reaction (OER) of oxidizing water in the system to $O_2$ (Equation 5). The water at the anode may be present from the gas stream, the molten phase of the electrolyte mixture within the membrane, etc.

The method 400 includes adjusting the voltage differential and the temperature for altering a ratio of the CO gas to the $H_2$ gas (CO:$H_2$) generated at the cathode. In one approach, the adjusting may tune the reduction of $CO_2$ to CO at the cathode and the reduction of water ($H_2O$) to $H_2$ gas, thereby altering the ration CO:$H_2$ of the generated syngas. In addition, the method includes adjusting the proportion of $CO_2$ in the system and release of $CO_2$.

The novel molten phase chemistry of HCDP membranes enables lower temperature operation than traditional dual phase membranes based on molten carbonate liquid phase and solid oxide conductors, as well as order of magnitude higher mass transport rates. Because HCDP membranes operate at flue gas temperatures of 300 to 650° C., the HCDP membranes offer the possibility of retrofit into current power plant designs, utilizing existing boiler or heat recovery steam generator infrastructure in conjunction with a low-pressure steam sweep. This characteristic in turn could allow for a significant reduction in carbon emissions without the need to replace the current fleet of cement plants.

Without wishing to be bound by any theory, it is believed that the embodiments described herein may overcome several drawbacks within the existing carbon capture technology, for example, such drawbacks as short operating lifetimes, oxidative degradation, and undesired carbon buildup on electrodes. According to various embodiments, the modular reactive capture apparatus may likely economically produce a low carbon intensity fuel and eliminate the need for desorption and compression of a high concentration $CO_2$ stream. By converting wasted $CO_2$ to value-added fuels, various embodiment described herein have the potential to not only reduce $CO_2$ emissions but also bring additional revenue to the cement industry. Furthermore, in one approach, the modular reactive capture apparatus may be integrated into existing plant infrastructure without impacting the overall footprint of the facility. Moreover, a thermo-electrochemical reactor as described herein may serve as the foundation of a reactive capture platform that may be tailored to selectively remove $CO_2$ from a variety of source streams and convert to various value-added chemicals and fuels.

EXPERIMENTS

Dual-Phase Membranes of $CO_2$ Separation

Figure 5:
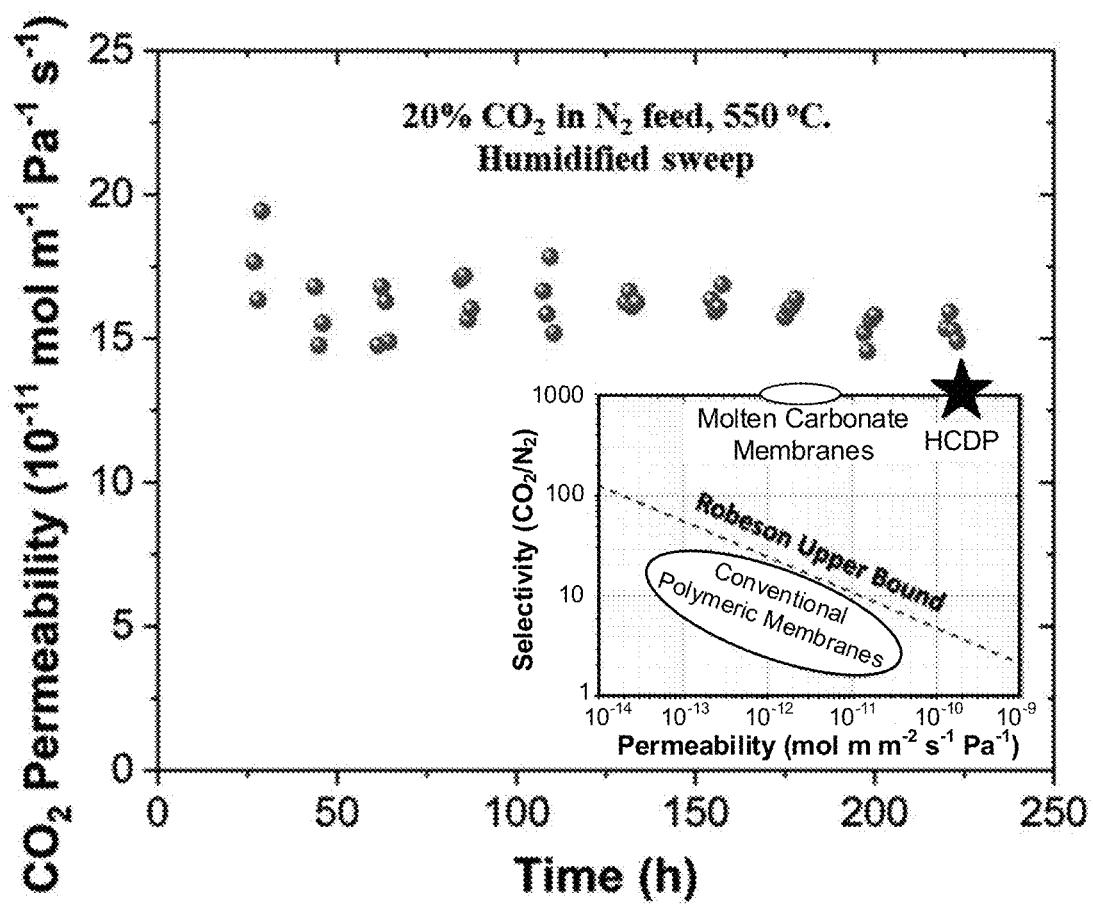
FIG. 5 is a plot of $CO_2$ permeability through a HCDP membrane, according to one embodiment.

HCDP membrane technology includes a nanoporous yttria-stabilized zirconia solid support phase that contains molten hydroxide in the pores. The HCDP membrane operated in the flue gas temperature range of 400 to 600° C. and demonstrated near-infinite selectivity for $CO_2$ over $N_2$. As depicted in FIG. 5, a $CO_2$ permeability of $1.78 \pm 0.16 \times 10^{-10}$ mol m m$^{-2}$s$^{-1}$ Pa$^{-1}$ ($5.32 \times 10^5$ Barrer) at 550° C. with 20 vol. % $CO_2$ in $N_2$, which is more than an order of magnitude greater than the best values for conventional dual-phase and polymer membranes. Furthermore, high $CO_2$ permeabilities of $1.31 \times 10^{-10}$ mol m m$^{-2}$s$^{-1}$Pa$^{-1}$ at 300° C. with 5 mol % $CO_2$ in $N_2$ were demonstrated using low temperature hydroxide electrolytes.

The inset shows a Robeson plot comparing the performance of HCDP membrane with ambient-temperature polymer and high temperature molten carbonate dual-phase membranes. Without wishing to be bound by any theory, it is believed that the remarkable performance of HCDP membranes is a result of molten phase transport of both $CO_3^{2-}$ and oxide (e.g., $OH^-$).

Figure 6:
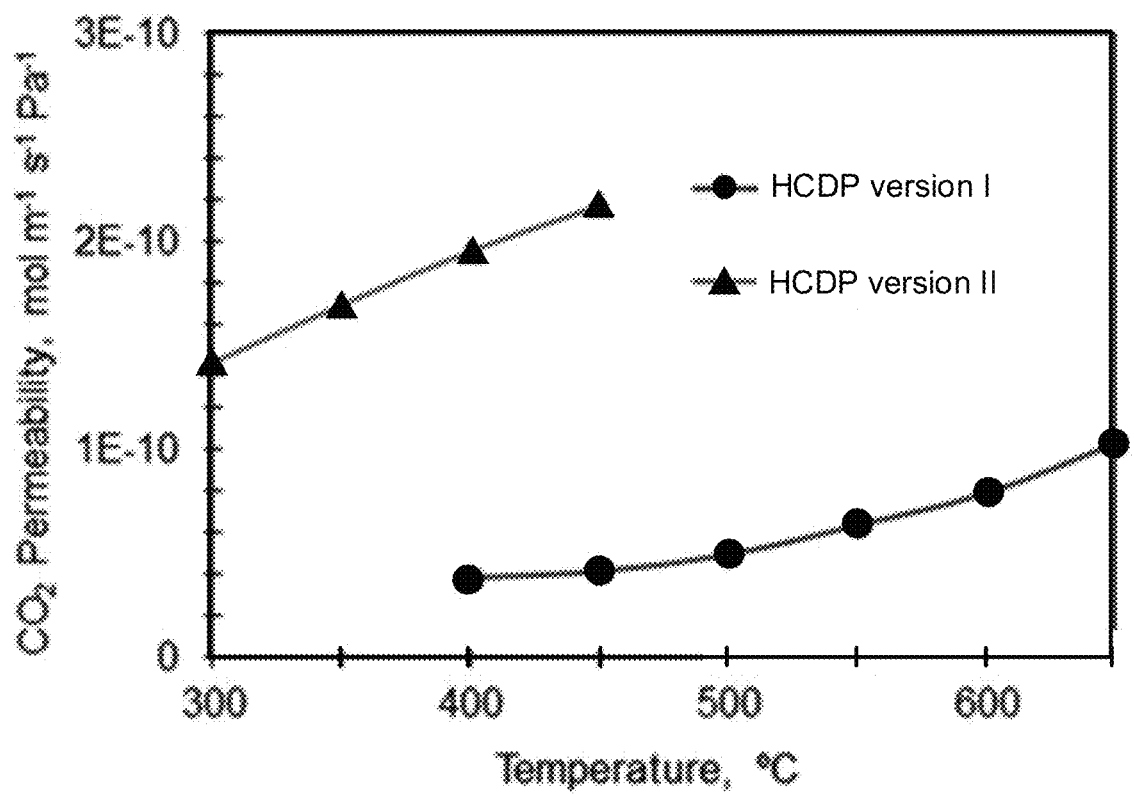
FIG. 6 is a plot of $CO_2$ permeability through different versions of a HCDP membrane relative to temperature, according to one embodiment.

Hydroxide eutectic mixtures that melt in a temperature range relevant to the temperature of the flue gas from cement production. In one approach, As shown in FIG. 6, HCDP membranes as described herein (▲) operated at greater performance in the 300 to 450° C. range compared to an earlier version of an HCDP membranes (●).

Simulations of Operating Environment of Apparatus

The operating environment was simulated to quantify electrochemical double layer properties. Atomistic scale modeling components was used to construct a framework for simulating electrocatalytic reactions at the electrode-molten hydroxide interface. In one approach, ab initio molecular dynamics (AIMD) simulations may simulate the metal/molten hydroxide interface using metal electrocatalyst candidates and selected electrolyte compositions. The AIMD simulations established a framework to simulate interfacial diffusion, double layer arrangement, and chemical interaction of the cationic and hydroxide ions with the metal electrocatalyst. In one approach, AIMD simulations of the electrochemical interface was conducted at several (e.g., three) different temperatures based on optimized conditions optimized. The metal may be constrained to operate under either constant charge or constant potential-controlled conditions to invoke electrolytic double layer (EDL) responses due to hybrid temperature-electric field stimuli.

In Use

According to various embodiments, a device may selectively remove $CO_2$ from dilute source streams (e.g., power plant flue gas, bio-gas, co-produced $CO_2$ with natural gas, air) and convert it directly to a valuable product (syngas, $CO+H_2$) in a single device in one step. In some approaches, the output syngas is a versatile feedstock that may be used to produce a variety of chemicals, materials, fuels, etc.

As described herein, one embodiment includes an advantageous intermediate temperature gas separation (e.g., between 150 to more than 400° C.) and electrochemical membrane technologies (e.g., $CO_2$ separation from fossil power plant flue gas, anion exchange membrane fuel cells).

Various embodiments of porous ceramic membranes with molten electrolyte solution may function in applications of $CO_2$ separation and sequestration. In some approaches, the porous ceramic membranes with sorbent solution may be useful in carbon capture and storage (CCS), greenhouse gas reduction, and pollution mitigation.

According to inventive concepts described herein, a porous ceramic structure may be used as a support material for catalysis applications. Inventive concepts as described herein may be used as material for high temperature sensors. Furthermore, the structures as presented may be optimal for high temperature oxide supports and/or membranes used in electrolytic cells and fuel cells.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While inventive concepts have been described above, it should be understood that they have been presented by way of example only, and not limitation. Thus, the breadth and scope of the various aspects of the present invention should not be limited by any of the above-described exemplary approaches but should be defined only in accordance with the following claims and their equivalents.

What is claimed is:

1. A thermo-electrochemical reactive capture apparatus, the apparatus comprising:
   an anode and a cathode, wherein the anode includes a first catalyst, wherein the cathode includes a second catalyst;

a porous ceramic support positioned between the anode and the cathode;

an electrolyte mixture in pores of the ceramic support, wherein the electrolyte mixture is configured to be molten at a temperature below about 600 degrees Celsius; and a steam flow system on an outer side of the cathode, wherein the outer side of the cathode is opposite an inner side of the cathode, wherein the inner side of the cathode is adjacent to the ceramic support, wherein the cathode is configured to generate syngas upon energization thereof and contact with carbon dioxide, wherein the syngas comprises carbon monoxide gas and hydrogen gas.

2. The apparatus as recited in claim 1, wherein the first catalyst is configured for an oxygen evolution reaction and the second catalyst is configured for a hydrogen evolution reaction.

3. The apparatus as recited in claim 1, wherein the second catalyst is configured for a carbon dioxide reduction reaction.

4. The apparatus as recited in claim 1, wherein the apparatus is operable to generate the syngas at temperatures in a range of about 150 degrees Celsius to about 400 degrees Celsius.

5. The apparatus as recited in claim 1, wherein the electrolyte mixture is characterized as including a hydroxide mixture when molten, wherein the hydroxide mixture includes an alkaline hydroxide having a melting point below 200 degrees Celsius.

6. The apparatus as recited in claim 5, wherein the porous ceramic support with the hydroxide mixture therein is a hydroxide ceramic dual phase membrane.

7. The apparatus as recited in claim 5, wherein the hydroxide mixture, when molten, is characterized as having at least one cation selected from the group consisting of: lithium, sodium, potassium, cesium, and rubidium.

8. The apparatus as recited in claim 1, wherein the cathode and the anode are porous.

9. The apparatus as recited in claim 1, wherein a material of the first catalyst and a material of the second catalyst are the same.

10. The apparatus as recited in claim 1, wherein a material of the first catalyst and a material of the second catalyst are different.

11. The apparatus as recited in claim 1, wherein the first and/or second catalyst comprise at least 5 weight % of a total weight of the anode and/or cathode, respectively, wherein the first and/or second catalyst is positioned as an outermost layer of the anode and/or cathode.

12. The apparatus as recited in claim 1, wherein the first and/or second catalyst include at least one metal selected from the group consisting of: platinum group metals, noble metals, transition metals, mixed metal oxides, alloys of transition metals, and a combination thereof.

13. The apparatus as recited in claim 1, wherein the anode and/or cathode includes an electrode material selected from the group consisting of: metal mesh, carbon material, metal particles, and a combination thereof.

14. The apparatus as recited in claim 1, wherein the apparatus is configured to have a triple phase boundary region in use, wherein the triple phase boundary region includes an association of the anode and/or cathode, a molten electrolyte mixture, and a gas.

15. The apparatus as recited in claim 14, wherein the gas is selected from the group consisting of: carbon dioxide gas, carbon monoxide gas, hydrogen gas, and steam.

16. The apparatus as recited in claim 1, wherein the ceramic support has physical characteristics of formation by an additive manufacturing technique.

17. The apparatus as recited in claim 1, comprising a power source for applying a voltage differential across the anode and the cathode.

18. The apparatus as recited in claim 1, wherein the apparatus is configured to produce carbonate from carbon dioxide absorbed in the electrolyte mixture.

19. The apparatus as recited in claim 1, wherein the steam flow system is configured to create steam for converting carbonate in the electrolyte mixture to carbon dioxide.

20. The apparatus as recited in claim 19, wherein the converted carbon dioxide is present on the cathode.

21. The apparatus as recited in claim 1, wherein the second catalyst is configured to reduce carbon dioxide present on the cathode to carbon monoxide.

22. The apparatus as recited in claim 1, wherein the cathode is configured to produce carbon monoxide according to a carbon dioxide reduction reaction and produce hydrogen gas according to a hydrogen evolution reaction.

23. A method for producing syngas using the apparatus as recited in claim 1, the method comprising:

directing a gas stream along the anode, wherein an inner side of the anode is adjacent to a dual phase membrane comprising the ceramic support infiltrated with a molten electrolyte mixture, wherein the dual phase membrane is sandwiched between the anode and the cathode, wherein at least the cathode includes the second catalyst;

applying a voltage differential across the anode and the cathode;

sweeping an outer side of the cathode with steam, wherein the inner side of the cathode is adjacent to the dual phase membrane; and generating a syngas at the cathode, wherein the syngas comprises carbon monoxide gas and hydrogen gas.

* * * * *